(12) United States Patent
Andrews et al.

(10) Patent No.: US 10,352,825 B2
(45) Date of Patent: Jul. 16, 2019

(54) SYSTEMS AND METHODS RELATED TO DETECTING BLOWOUT OCCURRENCES IN GAS TURBINES

(71) Applicant: General Electric Company, Schenectady, NY (US)

(72) Inventors: Peter Frank Andrews, Salem, VA (US); Paul Oliver Caffrey, San Ramon, CA (US); Robert Daniel Reviere, Chapel Hill, NC (US)

(73) Assignee: General Electric Company, Schenectady, NY (US)

( * ) Notice: Subject to any disclaimer, the term of this patent is extended or adjusted under 35 U.S.C. 154(b) by 119 days.

(21) Appl. No.: 15/592,553

(22) Filed: May 11, 2017

(65) Prior Publication Data

US 2018/0328817 A1    Nov. 15, 2018

(51) Int. Cl.

| | |
|---|---|
| *G01M 15/14* | (2006.01) |
| *F02C 9/28* | (2006.01) |
| *F23N 5/16* | (2006.01) |
| *F23N 5/24* | (2006.01) |
| *G01L 9/00* | (2006.01) |

(52) U.S. Cl.
CPC .............. *G01M 15/14* (2013.01); *F02C 9/28* (2013.01); *F23N 5/16* (2013.01); *F23N 5/242* (2013.01); *G01L 9/0008* (2013.01); *F05D 2270/092* (2013.01); *F05D 2270/81* (2013.01); *F23N 2025/04* (2013.01); *F23N 2041/20* (2013.01); *F23R 2900/00013* (2013.01)

(58) Field of Classification Search
CPC .......... F05D 2270/092; F05D 2260/80; G01M 15/14
See application file for complete search history.

(56) References Cited

U.S. PATENT DOCUMENTS

| | | | |
|---|---|---|---|
| 7,089,746 B2 | 8/2006 | Lieuwen et al. | |
| 7,337,057 B2* | 2/2008 | Norman ................... | F02C 9/00 60/39.27 |
| 7,461,509 B2* | 12/2008 | Mick ....................... | F01D 21/003 60/779 |
| 7,743,599 B2* | 6/2010 | Taware ................... | F23N 5/003 60/39.091 |
| 9,599,527 B2* | 3/2017 | Claussen .............. | G01L 19/0663 |
| 9,612,016 B2* | 4/2017 | Claussen .............. | G01L 19/0663 |
| 9,791,150 B2* | 10/2017 | Claussen .............. | G01L 19/0663 |
| 9,964,045 B2* | 5/2018 | Crothers ................. | F02C 9/28 |
| 2006/0137353 A1* | 6/2006 | Lieuwen ............... | F01D 21/003 60/772 |

(Continued)

*Primary Examiner* — Freddie Kirkland, III
(74) *Attorney, Agent, or Firm* — Frank A. Landgraff

(57) ABSTRACT

A system for controlling an operation of a combustor in a gas turbine that includes: an acoustic sensor configured to periodically measure a pressure of the combustor and generate a raw data stream having the pressure data points resulting from the periodic measurements; and a blowout detection unit configured to receive the raw data stream from the acoustic sensor. The blowout detection unit may include a processor and a machine-readable storage medium on which is stored instructions that cause the processor to execute a procedure related to a detection of a blowout precursor. The procedure may include an ensemble approach in which the detection of the blowout precursor depends upon a outcomes generated respectively by separate detection analytics.

18 Claims, 10 Drawing Sheets

(56) References Cited

U.S. PATENT DOCUMENTS

2015/0027211 A1* 1/2015 Claussen ............ G01L 19/0663
73/112.01
2015/0068294 A1* 3/2015 Claussen ............ G01L 19/0663
73/112.01

* cited by examiner

SYSTEMS AND METHODS RELATED TO DETECTING BLOWOUT OCCURRENCES IN GAS TURBINES

BACKGROUND OF THE INVENTION

This present application relates to combustors in gas turbine engines and related combustion systems or devices. More specifically, but not by way of limitation, the present application relates to using event stream processing techniques for detecting blowout precursors in combustors and related combustion systems and devices.

Combustors have long been used to burn a fuel/air mixture that is ultimately used to generate thrust, produce power, supply heat for some industrial process, or other application. In these systems, an important performance metric is for the flame to remain stable in the combustor over a range of flow rates, pressures, and fuel/air ratios. At certain conditions, however, the flame may blow out within the combustor, so that no flame exists. The problem of such a "blowout", as the condition will be referred to herein, has long limited allowable flow velocities through engines, particularly in systems such as gas turbines which must operate at high flow rates and/or low pressures. The problem of blowout, however, has become increasingly more severe in a range of combustion devices, as they are required to meet stringent emissions legislation, severe operability constraints, and achieve better performance.

As will be appreciated, the problem of flame blowout can occur in combustors of land-based turbine engines, aeronautical turbine engines, afterburners, industrial processing devices, or any other combustor device. With respect to land-based turbine engines, operators of such engines attempt to run the engine near flame blowout conditions, known as the lean blowout line. An advantage of operating so close to the blowout line is that nitrous oxide emissions are significantly lowered. The trade-off, however, is an increased likelihood of flame blowout occurring. In the land-based systems, a blowout event may require a potentially lengthy system shut down and restart, resulting in economic consequences to the power plant owner. Further, in an aeronautical setting, blowout is a particular concern during fast engine transients, such as when rapid acceleration or deceleration of the engine is attempted. If the flame blows out in a commercial airplane, there are obvious safety concerns for the passengers, though most engines can be re-ignited in-flight. However, because of the magnitude of the possible consequences, engine designers include substantial safety margins into the engines to avoid these events, often at the cost of reduced performance.

The need to avoid blowout in combustors often causes designers to sacrifice performance in other areas. In particular, because there is always some uncertainty in the exact conditions under which blowout occurs, extra margin must be built into the design. In such systems, performance could be improved—and the occurrence of blowout more effectively avoided—if systems and methods existed to monitor the proximity of the system to blowout. Thus, there exists a need in the industry for systems and methods for accurately predicting flame blowout conditions on various types of combustors.

BRIEF DESCRIPTION OF THE INVENTION

The present application thus describes a system for controlling an operation of a combustor in a gas turbine that includes: an acoustic sensor configured to periodically measure a pressure of the combustor and generate a raw data stream that comprises pressure data points resulting from the periodic measurements; and a blowout detection unit configured to receive the raw data stream from the acoustic sensor. The blowout detection unit may include a processor and a machine-readable storage medium on which is stored instructions that cause the processor to execute a procedure related to a detection of a blowout precursor. The procedure may include an ensemble approach in which the detection of the blowout precursor depends upon a outcomes generated respectively by separate detection analytics.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
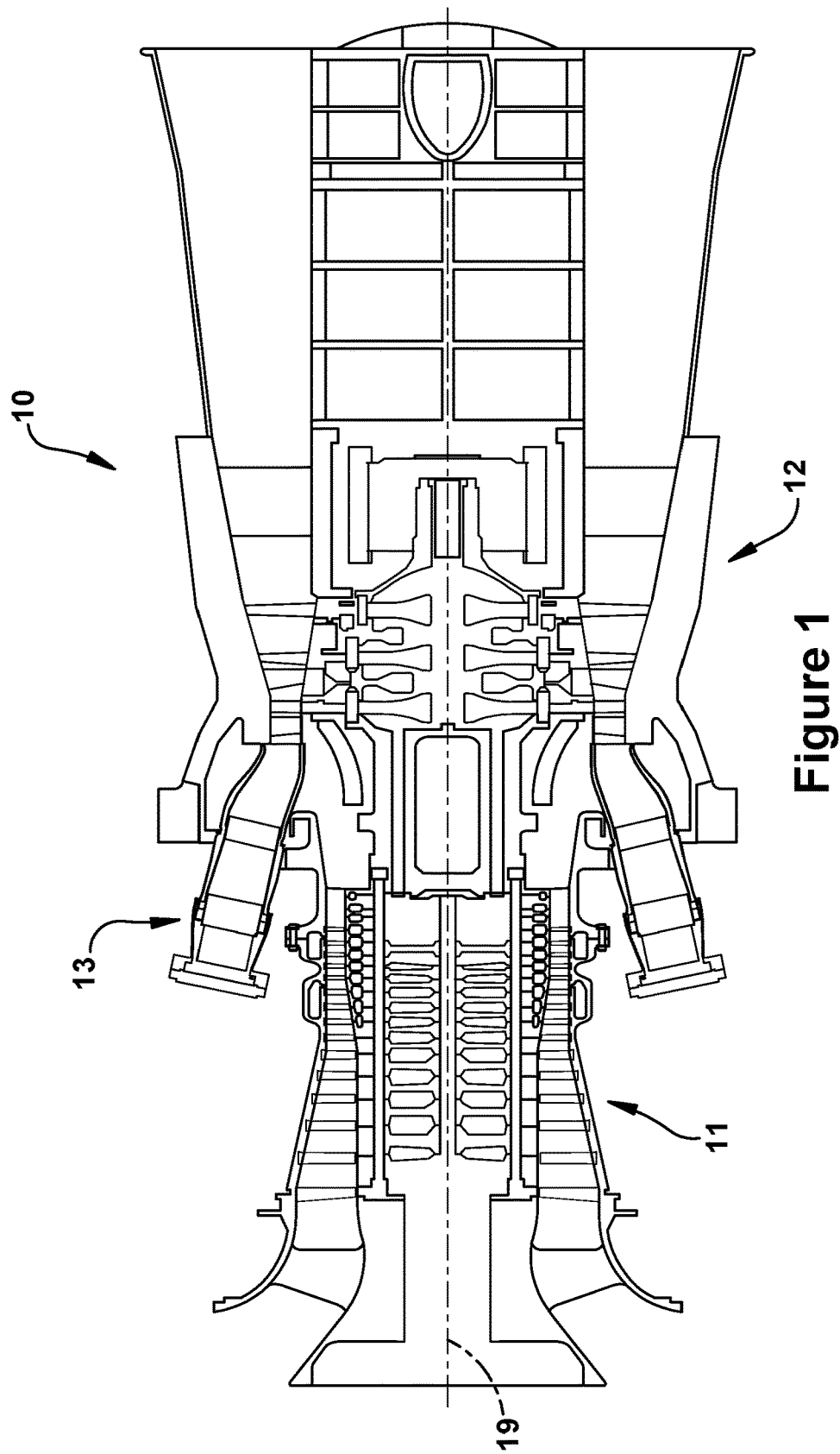
FIG. 1 is a schematic representation of an exemplary gas turbine with which embodiments of the present invention may be used.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

By way of background, referring now with specificity to the figures, FIG. 1 illustrates an exemplary gas turbine that includes a type of combustor within which the present invention may be used. It will be understood by those skilled in the art that the present invention may not be limited to this type of usage, and that the examples are not meant to be limiting unless otherwise stated. FIG. 1 is a schematic representation of a gas turbine 10. In general, gas turbines operate by extracting energy from a pressurized flow of hot gas produced by the combustion of fuel in a stream of compressed air. As illustrated in FIG. 1, the gas turbine 10 includes an axial compressor 11 that is mechanically coupled by a common shaft or rotor to a downstream turbine section or turbine 12, with a combustor 13 being positioned between the compressor 11 and the turbine 12. As illustrated in FIG. 1, the gas turbine may be formed about a common central axis 19.

In one example of gas turbine operation, the rotation of compressor rotor blades within the axial compressor 11 compresses a flow of air. In the combustor 13, energy is released when the compressed air is mixed with a fuel and ignited. The resulting flow of hot gases or "working fluid" from the combustor 13 is then directed over rotor blades within the turbine, which induces the rotation of the blades about the shaft. In this way, the energy of the flow of working fluid is transformed into the mechanical energy of the rotating blades and, given the connection between the rotor blades and the shaft, the rotating shaft. The mechanical energy of the shaft then may be used to drive the rotation of the compressor rotor blades, such that the necessary supply of compressed air is produced, and, for example, a generator to produce electricity.

Figure 2:
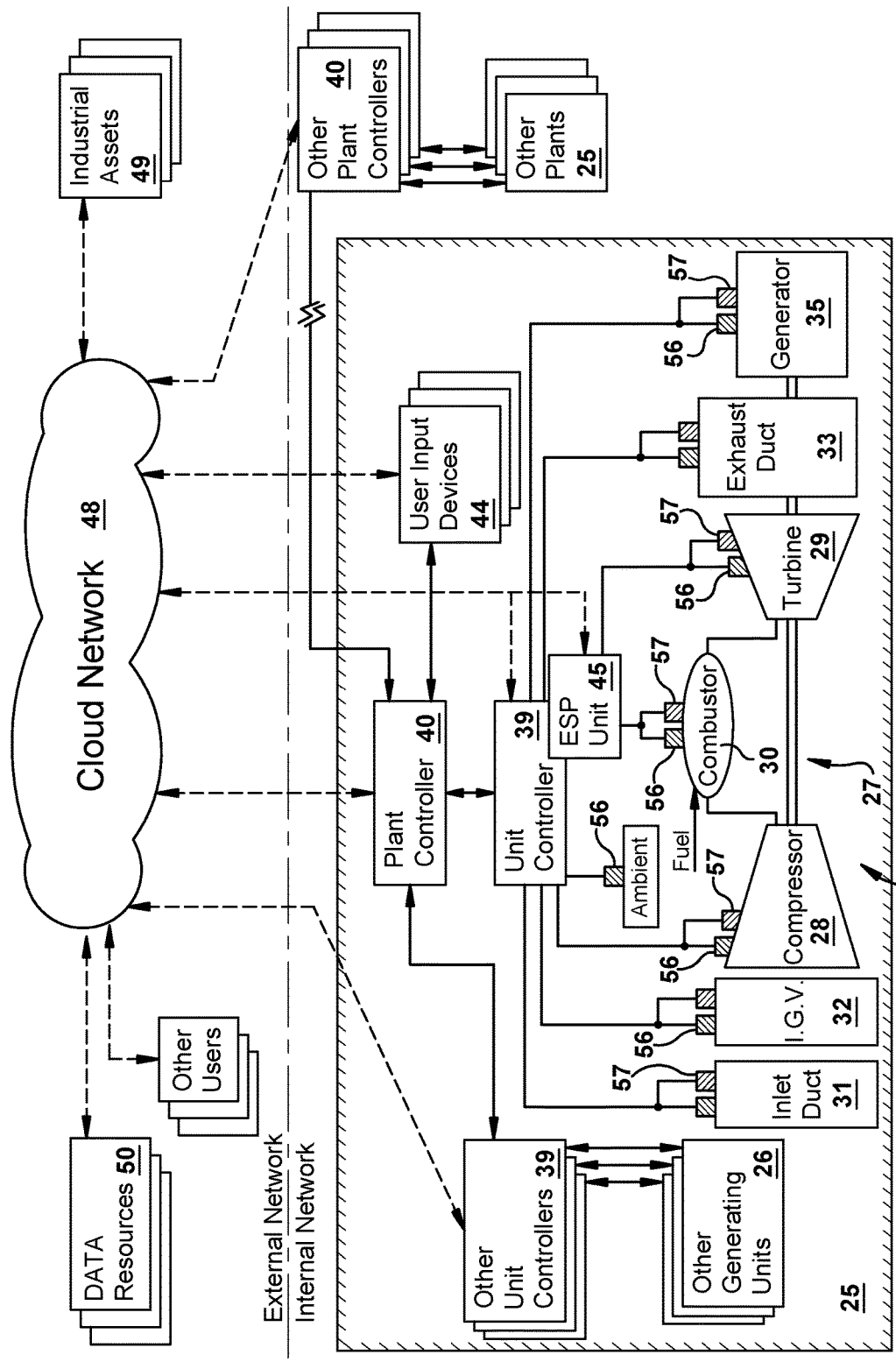
FIG. 2 illustrates a schematic diagram of an exemplary gas turbine with a control system and cloud network support in accordance with aspects and exemplary embodiments of the present invention.

FIG. 2 is a schematic diagram of an exemplary industrial asset, facility or power plant—herein "power plant" or "power plant 25". The power plant 25 may include any number of subsystems, components, or generating units— herein "generating units" or "generating units 26". In this case, for example, the generating unit 26 is a combustion or gas turbine engine or system—herein "gas turbine" or "gas turbine 27"—which may be similar to the engine introduced in FIG. 1. It should be understood that FIG. 2 is provided as an exemplary system by which operational data may be gathered within any of the generating units 26 that may be included within the power plant 25 and used for the management thereof. The various generating units, thus, may be connected to computer-implemented control systems and communication networks for the control and optimization of performance pursuant to analytics, processes, and other functionality described herein. For example, within such control systems, gathered operational data may be provided electronically to computer-implemented analytics, data repositories, plant or unit controllers, cloud-based services, and/or user input devices so to enable a variety of functions, for example, deriving control setpoints related to the operation of the generating unit, data storage/recall, generating user interfaces, prompting/obtaining user input, decision support for long-term and short-term operations, automated control responses, etc. As will be appreciated, such control systems may send/receive electronic communications to/from each of the systems, subsystems, components, sensors, actuators, and/or other equipment within the power plant 25 and/or generating unit 26, as well as manipulate control settings related thereto in a manner consistent with the functionality described herein.

Referring now with specificity to FIG. 2, the gas turbine 27 may include a combustion turbine engine that, in general, operates by extracting energy from a pressurized flow of hot gas produced by the combustion of fuel in a stream of compressed air. As shown, the gas turbine 27 may include an axial compressor 28 that is mechanically coupled by a common shaft to a downstream turbine section or turbine 29, with a combustor 30 being positioned therebetween. In one example of operation, the rotation of compressor rotor blades compress a flow of air within the compressor 28. Then, energy is released in the combustor 30 when the compressed airflow is mixed with a fuel and ignited. The resulting flow of hot gases or "working fluid" is then directed over rotor blades within the turbine 29, which induces the rotation of the shaft. In this way, the energy of the fuel is transformed into the mechanical energy of the rotating shaft, which then may be used to drive the rotation of the compressor rotor blades, so to produce the supply of compressed air, as well as turn the coils of a generator to produce electricity.

The gas turbine 27 may be part of a complex system that includes many other subsystems and components. For example, as further shown, the gas turbine 27 may include an inlet duct 31 that channels ambient air into the compressor 28. From there, the ingested air may flow through inlet guide vanes 32, which operate to desirably condition the flow of air as it enters the compressor 28. In addition, the gas turbine 27 may include an exhaust duct 33 that channels combustion gases from an outlet of the turbine 29 through, for example, emission control and sound absorbing devices. Finally, the gas turbine 27 may include a generator 35 that is operably connected to the common shaft of the gas turbine for converting the rotation thereof into electricity. Other subsystems and components also may be present.

The gas turbine 27 further may include a control system or controller, which will be referred to herein as a unit controller 39, that monitors and controls the operation of the engine. As an example, the unit controller 39 may be a Mark VI™ Turbine Control System from General Electric, which is designed to fulfill a variety of control requirements for such engines as well as protect against adverse or abnormal operating conditions. The unit controller 39, thus, may perform many functions, including fuel, air and emissions control, sequencing of turbine fuel for start-up, shut-down and cool-down, synchronization and voltage matching of the generator, monitoring of all gas turbine control and auxiliary functions, and protection against unsafe and adverse operating conditions, as well as other functionality which may be described or implied herein. As also shown, in cases where the gas turbine 27 is part of a larger power plant, the unit controller 39 may connect to a plant controller 40 that controls the operation of the power plant 25. As discussed more below, each of the unit controller 39 and plant controller 40 may include a computer system having digital processing resources or processing capabilities—herein "processor"—as well as data storage or memory capabilities—herein "memory". Alternatively, the unit controller 39 and/or the plant controller 40 may be combined into a single controller having an integrated architecture. The unit controller 39, plant controller 40, and the computer system related to each—also referenced collectively herein as "controllers"—may connect to user interface or input devices—herein "user input devices" or "user input devices 44". Such connections, as illustrated, may be made either through internal or external networks. The user input devices 44 may be used to receive and send communications from/to any of the personnel associated with the operation of the power plant 25 or generating unit 26. It should be understood that such user input devices 44 may include any conventional computer-implemented device having a user interface, without limitation, including mobile devices and other workstations whether locally or remotely disposed relative to the location of the power plant 25 or generating unit 26. As also shown in FIG. 2, several other generating units 26 may be provided, each of which may include a unit controller 39 that connects to or is integrated with the plant controller 40. The plant controller 40 may further connect to other plant controllers 40 associated with the operation of other power plants 25.

As stated, each of the unit controller 39 and plant controller 40 may include a computer system. It should be understood that such computer systems may include one or more processors, memory, and other conventional computing components as may be required given any of the functionality described herein. As further anticipated by the present application, the computer systems related to the unit controller 39 and plant controller 40 may include non-local aspects distributed throughout the several other resources or nodes depicted throughout FIG. 2, as will be described in more detail to follow. For example, these other nodes may include, without limitation: a communication network, cloud or cloud-based platform—herein "cloud network 48", or more generally "cloud"; data repositories or other informational resources—herein "data resources" or "data resources 50"; the several user input devices 44; and other linked unit controllers, plant controllers, and industrial assets 49. Therefore, it should be understood that the consolidated and localized depiction of the unit controller 39 and plant controller 40 in FIG. 2, as well as the computer systems, processors, and memory resources related to each, is merely exemplary and not meant to limit the manner in which any functionality described herein is performed or executed, unless otherwise expressly stated. Along these lines, it should be further appreciated that reference to the unit controller 39, the plant controller 40, and/or the computer systems associated with each may include computing resources, such as processing, storage, memory, data and communication devices, which are distributed and accessible via internal or power plant level networks as well as the cloud or cloud network 48, as would be understood by one of ordinary skill in the art given a distributed computing environment and the functionality described herein, whether that functionality be expressly stated or implied.

The gas turbine 27, as well as any of the other generating units 26, may include multiple sensors 56 that are configured to monitor particular operational aspects of the gas turbine 27 by detecting or measuring various operating conditions or parameters throughout the engine, including, for example, conditions within the compressor 28, turbine 29, combustor 30, generator 35, ambient environment, etc. For example, the sensors 56 may include temperature sensors that monitor ambient temperature, compressor discharge temperature, turbine exhaust temperature, and other temperatures along the working fluid flowpath through the gas turbine 27. The sensors 56 may further include acoustic or pressure sensors that monitor ambient pressure, static and dynamic pressure levels at the compressor inlet, compressor outlet, combustor, turbine exhaust, and at other suitable locations within the gas turbine 27. The sensors 56 also may include humidity sensors that measure ambient humidity in the inlet duct 31 of the compressor 28. The sensors 56 also may include flow sensors, velocity sensors, acceleration sensors, flame detector sensors, valve position sensors, guide vane angle sensors, as well as any other conventional sensor anticipated given the functionality described herein that may be used to measure various parameters and conditions relative to the operation of the gas turbine 27. As used herein, the term "parameter" refers to measurable physical properties of operation which collectively may be used to define operating conditions within a system, such as the gas turbine 27 or other system described herein. Such operating parameters may include those just described, including, without limitation, temperatures, pressures, humidity, and gas flow characteristics at locations defined along the path of the working fluid, as well as ambient conditions, fuel characteristics, and other measurables, as may be described or implied by any of the functionality described herein.

It will be appreciated that the gas turbine 27 also may include several actuators 57 by which control of the gas turbine 27 is achieved. For example, such actuators 57 may include electro-mechanical devices having variable setpoints or settings that allow for the manipulation of certain process inputs—herein "manipulated variables"—for the control of process outputs—herein "controlled variables"—in accordance with a desired result or mode of operation. The control of the manipulated variables via the actuators 57 must take into account other non-controllable variables—herein "disturbance variables"—which also affect the operation of the gas turbine 27. Thus, for example, commands generated by the controller the unit controller 39 may cause one or more actuators 57 within the gas turbine 27 to adjust valves between a fuel supply and the combustor 30 to regulate flow level, fuel splits, or fuel type. As another example, commands generated by the unit controller 39 may cause one or more actuators 57 to adjust a setting that changes an angle of orientation of the inlet guide vanes 32 and thereby affects the manner in which air enters the compressor 28.

Thus, in accordance with exemplary embodiments, the computer systems of the unit controller 39 and/or plant controller 40 may execute code or software that is configured to control the gas turbine 27 and/or power plant 25 pursuant to a desired mode of operation. Such control may be responsive to operational data supplied by the sensors 56 as well as to instructions received from the user input devices 44, and such control may be implemented via manipulating one or more of the actuators 57. In furtherance of this, the user input devices 44 may be accessed and used by plant managers, technicians, engineers, operators, energy traders, owners, and/or any other stakeholder, as may be described or implied by any of the functionality provided herein. The software executed by the computer system may include scheduling algorithms for regulating any of the systems or subsystems described herein. For example, the software may enable the unit controller 39 to control the operation of the gas turbine 27 based, in part, on algorithms stored in the memory of the unit controller 39. These algorithms, for example, may maintain a firing temperature of the combustor to within predefined limits. It will be appreciated that algorithms may include inputs for parameter variables such as compressor pressure ratio, ambient humidity, inlet pressure loss, turbine exhaust backpressure, as well as any other suitable parameters. The software may include schedules and algorithms that accommodate variations in ambient conditions that affect emissions, combustor dynamics, firing temperature limits at full and part-load operating conditions, etc. As discussed in more detail below, the executed software may further apply algorithms for scheduling the gas turbine, such as those settings relating to desired turbine exhaust temperatures and combustor fuel splits, with the objective of satisfying performance objectives while complying with operability boundaries of the engine. For example, the computer system of the unit controller 39 may determine combustor temperature rise and NOx during part-load operation in order to increase the operating margin to the combustion dynamics boundary and thereby improve operability, reliability, and availability of the unit.

As further shown, the gas turbine 27 may include one or more event stream processing ("ESP") units 45. As discussed in more detail below, the ESP unit 45 may be configured as an "edge computing device" through which raw data from one or more of the sensors 47 is streamed before such data is aggregated, transformed, and/or materially processed for efficient ingestion and use by the unit controller 39. The ESP unit 45 may be integrated into the unit controller 39 or made a separate device, and, as discussed more below, may include one or more analytic units for detecting anomalies in an incoming stream of raw data. As will be appreciate, such analytic units or edge devices may be used to detect precursors that signal operational anomalies as well as enable particularly rapid control responses so that harmful anomalies may be avoided.

The computer systems of the unit controller 39, plant controller 40, and/or ESP unit 45 may be connected to the cloud or cloud network 48 and, via this connection, data, instructions, communications, software, and other information may be exchanged pursuant to the functionality described herein. The cloud network 48 further may include computational resources, data storage, analytics, platform services, and other resources and services pursuant to the functionality described herein. The cloud network 48 may include an external network that connects remote industrial assets or power plants, as well as a component level network (referred to in FIG. 2 as an "internal network") to other resources, such as other users, other industrial assets 49, and data resources 50. The connections made between the cloud network 48 and any of the other nodes of FIG. 2 may be wired or wireless and/or inclusive of any conventional communication systems or devices. As will be appreciated, the cloud network 48 may be part of a larger communication system or network, including the Internet and/or one or more private computer networks, that has a distributed architecture. In this manner, the unit controller 39 and plant controller 40 may receive information, data, and instructions from and/or send information, data, and instructions to data resources 50. Connection to such data resources 50 may be made via the cloud network 48 or, alternatively, one or more of resources of the data resources 50 may be stored locally and be accessed outside of the cloud network 48 via a private or internal network. Additionally, as discussed more below, the cloud network 48 may connect the gas turbine 27 to other industrial assets 49, such as other remote gas turbines, power plants, or the facilities of suppliers or customers.

As used herein, the data resources 50 of FIG. 2 may include several types of data, including but not limited to: market data, operational data, and ambient data. Market data, for example, may include information on market conditions, such as energy sales price, fuel costs, labor costs, regulations, etc. Operational data, for example, may include information relating to the operating conditions of the power plant 25, the gas turbine 27 or related components. Such operational data may include temperature or pressure measurements, air flow rates, fuel flow rates, etc. within the gas turbine 27. Ambient data, for example, may include information related to ambient conditions at the power plant, such as ambient air temperature, humidity, and/or pressure. Market, operating, and ambient data each may include historical records, present condition data, and/or data relating to forecasts. For example, data resources 50 may include present and forecast meteorological/climate information, present and forecast market conditions, usage and performance history records about the operation of the power plant 25 or gas turbine 27, and/or measured parameters regarding the operation of other similarly situated power plants or gas turbines, which may be defined as those having similar components and/or configurations. Other data, as may be described or implied by the functionality described herein, also may be stored and recalled from data resources 50 as needed.

Thus, according to exemplary embodiments, it should be understood that, while each of the unit controller 39 and plant controller 40, as well as the ESP unit 45, may include computer systems having a processor, memory, databases, communication devices, and other computing resources, it should be appreciated that these resources may be distributed, for example, across any of the several nodes depicted in FIG. 2, including the ESP unit 45, unit controller 39, plant controller 40, user input devices 44, cloud network 48, data resources 50, other industrial assets 49, etc. That is, while certain aspects the unit controller 39 and plant controller 40 may be locally disposed, other aspects may be remote and operationally connected via the cloud network 48, as indicated by the dotted lines of FIG. 2. As stated, the unit controller 39 and plant controller 40—also referenced collectively herein as "controllers"—may be connected to each piece of equipment, subsystem, or component within the power plant, including the gas turbine 27 and related subsystems, such that the sensors 56 deliver data to the controllers and the actuators 57 are responsive to commands received from the controllers. Unless otherwise stated, however, present systems and methods may include embodiments that are not configured to directly control the gas turbine or other generating unit and/or to directly measure operating conditions. In those presently described embodiments that do directly measure/control operation of the gas turbine or other generating unit, such control may be made pursuant to a "control program", which may be stored, in whole or in part, within the memory of the computer systems of the unit controller 39 and/or plant controller 40 and, when operated, makes the computer systems thereof manage data and perform the processes, analytics, and logic as provided herein.

More specifically, according to an exemplary manner of operation, a processor of the computer systems of the controllers executes software or program code (herein "program code") that defines the control program. While executing the program code, the processor processes data, which results in reading and/or writing transformed data from/to memory. Displays on the user input devices 44 may enable a human user (also "operator"), such as any of those described herein, to interact with the computer system using a communications link, such as may be provided via the cloud network 48. As will be appreciated, the cloud network 48 may enable the computer system to communicate with any of the other devices described herein, regardless of location. To this extent, the control program of the present invention may manage a set of interfaces that enable several users to interact with the control program. Further, the control program, as discussed further below, may manage (e.g., store, retrieve, create, manipulate, organize, present, etc.) data, such as control data or operational data. The controllers may include one or more general purpose computing articles of manufacture capable of executing the program code of the control programs once it is installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, the program code may include object code, source code, and/or executable code, and may form part of a computer program product when on computer readable medium. It is understood that the term "computer readable medium" may comprise one or more of any type of tangible medium of expression, now known or later developed, from which a copy of the program code may be perceived, reproduced, or otherwise communicated by a computing device.

As will be appreciated, when the computer executes the program code, it becomes an apparatus for practicing the invention, and on a general-purpose microprocessor, specific logic circuits are created by configuration of the microprocessor with computer code segments. For example, a technical effect of the executable instructions may be to implement a control method and/or system and/or computer program product that uses models to enhance, augment or optimize operating characteristics of industrial assets to improve economic return given a set of constraints, such as ambient conditions, market conditions, performance parameters, life cycle costs, etc. In addition to using current information, historical and/or forecast information may be employed, and a feedback loop may be established to dynamically operate the generating unit and/or power plant more efficiently during fluctuating conditions. The computer code of the control program may be written in computer instructions executable by the computer systems of the controllers. To this extent, the control program executed by the controllers and/or other distributed computer resources may be embodied as any combination of system software and/or application software. Further, the control program may be implemented using a set of modules. In this case, a module may enable the controllers to perform a set of tasks used by control program, and may be separately developed and/or implemented apart from other portions of control program. As will be appreciated, when the computer system executing the control program includes multiple computing devices, such as previously described, each computing device may have only a portion of control program or program code fixed thereon.

Thus, generally, the control program may enable computing and digital resources—such as those specifically described herein or which may be generally referred to as a "computer system"—to implement a unit controller or plant controller in accordance with the functionality provided here, particularly those figures to follow that include data flow diagrams, algorithms, methods, analytics, and/or logic. For purposes herein, such a computer system may obtain data via any conventional means. For example, such a computer system may calculate control data for a generating unit or power plant, retrieve control data relating to a generating unit or power plant from one or more data stores, repositories or sources, and/or receive control data for a generating unit or power plant from other systems or devices in or outside of the locality of the generating unit or power plant. In other embodiments, the present application provides methods of providing a copy of the program code, such as for executing the control program, which may include the implementation of some or all the processes described herein. It should be further understood that aspects of the present invention may be implemented as part of a business method that performs a process described herein on a subscription or fee basis. For example, a service provider may implement the control program at a customer generating unit or power plant. In such cases, the service provider may manage the computer system or controllers that performs one or more of the processes described herein for the customer facility.

Thus, aspects of the innovations described herein are related to what is often referred to as the "Industrial Internet of Things" ("IIoT"). As will be appreciated, the IIoT generally refers to the use of industrial connectedness toward enhanced management of industrial assets, such as power plant and generating units introduced above. The IIoT connects industrial assets to the Internet or a cloud-based or "cloud" computing environment, such as the previously discussed cloud network of FIG. 2. In this manner, the IIoT links industrial assets to each other in meaningful ways—for example, carrying information therebetween and remotely to other cloud resources and user input devices—so that more effective ways to manage those industrial assets are enabled and realized. This is achieved by insights that would otherwise go unnoticed but for the interconnectedness fostered by the IIoT.

By way of a simplified example, the cloud may include a computing system having one or more processors, one or more databases, and a plurality of users and/or industrial assets that are in data communication through those computing systems, as well as one or more modules implemented via those computing systems that are configured to perform a specific task. Such tasks, for example, may relate to asset maintenance, performance analytics, data storage and transfer, security, and/or other functions as provided herein. Present systems and methods, thus, should be understood in this context, for example, where cloud resources associated with the IIoT may be used to receive, relay, transmit, store, analyze, or otherwise process data and information for or about one or more connected industrial assets and users.

It should be understood, however, that the integration of industrial assets with such remote computing resources toward the enablement of the IIoT remains technically challenging, often presenting technical hurdles separate and distinct from the specific industry involved and computer networking, generally. For example, a given industrial asset—such as the previously described power plant 25 or gas turbine 27 of FIG. 2—may require configuring with novel interfaces and communication protocols to send and receive data to/from cloud resources. Further, because industrial assets typically have strict requirements for cost, weight, security, performance, signal interference, and the like, the enablement of such interfaces or protocols is rarely as simple as combining or connecting the industrial asset with general-purpose computing devices. Thus, to address these and other problems resulting from the intersection of certain industrial fields and the IIoT, embodiments of the present invention may enable improved interfaces, techniques, protocols, and/or analytics for facilitating communication with and configuration of industrial assets via remote computing platforms and frameworks. Solutions in this regard may relate to improvements that address challenges related to specific types of industrial assets (e.g., power plants, gas turbines, aircraft engines, wind turbines, locomotives, combined cycle power plants, etc.), or to improvements that correspond to particular problems related to the use of industrial assets with remote computing platforms and frameworks, or, for that matter, to improvements that address problems related to the operation of the cloud-based platform itself via improved mechanisms for configuration, analytics, and/or remote management of industrial assets.

By way of example, the Predix™ platform available from General Electric is one such cloud-based platform that includes systems and methods relating to the management of industrial assets. As will be appreciated, the Predix™ platform is brought about by state of the art tools and cloud computing techniques that enable incorporation of a manufacturer's asset knowledge with a set of development tools and best practices for the purposes of spurring innovation. The Predix™ platform, thus, represents a purpose-built cloud-based platform for developing, deploying, operating, and monetizing cloud-based applications related to industrial assets. With this, General Electric has effectively combined cutting-edge technology and decades of industry experience to construct a platform that securely ingests machine-grade data at scale and analyzes it to deliver timely outcomes. Through the use of such systems and methods, manufacturers of industrial assets may more effectively leverage the unique understanding of the assets they build so to foster insights that bring additional value to customers. Optimized for the unique and demanding requirements of industrial applications, Predix™ is flexibly configured to work with operating assets from a range of vendors and vintages, and is sufficient to capture and analyze the unique volume, velocity, and variety of machine data now generated across the industrial world within a secure, industrial-strength cloud environment. Therefore, it should be understood that the Predix™ platform may serve as a component and/or enabler of those presently described embodiments that relate to the design, operation, and/or management of industrial assets within the IIoT, allowing users to bridge gaps between software and operations to enhance asset performance, optimize operations, foster innovation, and, ultimately, provide greater economic value. The Predix™ platform, for example, may serve as a component and/or enabler of aspects of the previously described cloud network 48 of FIG. 2, and the various digital, computing, and communication resources associated therewith, without limitation, and may be deployed in accordance with the functionality described herein.

Figure 3:
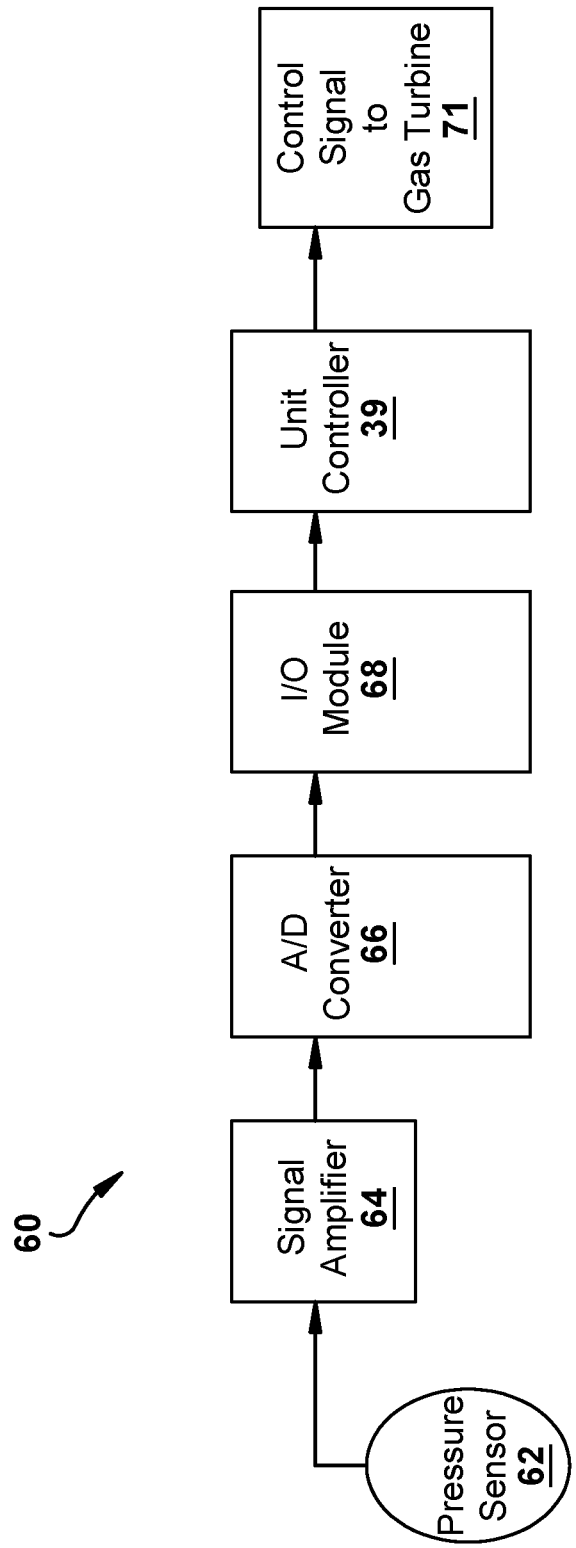
FIG. 3 is a block diagram illustrating exemplary components of a signal processing system with which exemplary embodiments of the present invention may be used.

Turning now to FIG. 3, a schematic representation is provided of an exemplary signal processing system 60 with which, as discussed below, embodiments of the present invention may be used. As will be appreciated, the signal processing system 60 is configured to receive streaming data from a sensor, which in this case is shown as an acoustic or pressure measuring device (which may be referred to either as an acoustic sensor or pressure sensor 62) that is coupled to a combustor of a gas turbine. The signal processing system 60 may connect the pressure sensor 62 to a controller, such as unit controller 39, that controls the operation of a gas turbine and/or the combustion systems thereof. More specifically, with reference again to the gas turbine 27 of FIG. 2, the pressure sensor 62 may represent one of the sensors 56 that is shown as being coupled to the combustor 30 and connected to the unit controller 39 via the ESP unit 45. As will be appreciated, the pressure sensor 62 may be situated within the combustor 13 to measure an acoustic signal, which is also referred to herein as a pressure signal, in a desired manner. For example, the pressure sensor 62 may be suitably mounted in the combustor, tangential to the combustor, or coupled to the combustor in any other acoustically acceptable way so to sufficiently measure a combustor pressure. The pressure sensor 62, for example, may be a pressure transducer or any other device that is configured for accurately taking oscillating pressure measurements while coupled to the combustor and subjected to the harsh operating conditions that may be associated therewith. As depicted in the exemplary signal processing system 60 of FIG. 3, the pressure sensor 62 may be an analog sensor, though, according to other embodiments, the pressure sensor 62 may be digital. The pressure sensor 62 may be configured to periodically measure the pressure of the combustor. According to exemplary embodiments, the pressure sensor may be capable of measuring pressure oscillations of up to approximately 20 KHz. According to other embodiments, the frequency of the periodic measurement of pressure may be at least 10 KHz. More preferably, the frequency is at least 13 KHz. The raw data stream may include each of the pressure data points generated by the acoustic sensor.

Though other configurations are also possible, the signal processing system 60 may further include a signal amplifier 64, an analog-to-digital converter ("A/D converter") 66, and an input-output module ("I/O module") 68. Each of these components may function in a conventional manner and, in doing so, process the streaming signal of pressure data being transmitted by the pressure sensor 62 before that data is received by the unit controller 39. As will be appreciated, the processed data, once received, may then be used by the unit controller 39 as feedback in a control loop for controlling the gas turbine, or, more precisely, the combustion system thereof. Thus, as further shown, the unit controller 39 may send control signals 71 to the control devices or actuators of the gas turbine for the control thereof, where those control signals 71 are based at least in part on the data received from the pressure sensor 62.

Within the signal processing system 60, the streaming pressure data transmitted by the pressure sensor 62 may be transformed pursuant to known signal processing techniques. This, as will be appreciated, is generally done so to that the data stream being fed into the unit controller 39 is in a form that promotes efficient consumption and use by the unit controller toward the control of the gas turbine. The need for this relates to the rapid responses required from unit controllers for effective control of the gas turbine, and the computational delays that might ensue should the unit controller—and the many complex control algorithms it uses—be over inundated with unprocessed data. As will be appreciated, power plant and unit controllers must react quickly to changing operating conditions, and the ingestion of highly granular data streams—such as those that advanced sensors now produce—can computationally overload those controllers so that control feedback is delayed and, often time, not timely. Thus, over the course of the processing of the signal—i.e., between the pressure sensor 62 and the unit controller 39—the data stream is transformed from what will be referred to herein as a "raw data stream" into a "processed data stream". More specifically, for purposes herein, a data stream will be referred to as being "raw" until signal processing or other processing has materially transformed it. Such material transformation may include an aggregation or condensing. If, however, substantially all the original pressure data points transmitted by the pressure sensor 62 remain in the data stream, the data stream will still be referred to herein as being "raw", having "raw data", or being a "raw data stream". Accordingly, as used herein, amplifying the data within the signal amplifier 64 will not be considered a transformation that transforms the data stream into a processed one. Likewise, as used herein, the data stream will still be considered as "raw" after the A/D converter 66 simply converts the pressure data points from analog to digital.

However, as used herein, certain signal processing techniques, for example, those completed within the I/O module 68 or similar componentry, may be considered a materially transformation such that, for purposes herein, the data stream becomes one that consists of "processed data". This transformation, as used herein, may include a sampling or filtering or other process by which the data is substantially aggregated, condensed, or sampled. Additionally, this type of transformation, as used herein, includes the converting the data stream from a function of time into a function of frequency, such as by a fast Fourier transformation ("FFT") algorithm. Thus, in each of these transformational cases, the data stream from the pressure sensor 62 will be considered as being transformed from a "raw data stream" into a "processed data stream". For example, when these concepts are applied to the signal processing system 60 of FIG. 3, the data stream from the pressure or acoustic sensor 62 may be considered a raw data stream until it is transformed within the I/O module 68. Specifically, within the I/O module 68, the data stream may be transformed via aggregation, condensing, or an FFT algorithm such that the data stream becomes a processed data stream thereafter.

The present invention now will be described more fully hereinafter with reference to FIGS. 4 through 10, in which certain preferred embodiments of the invention are shown. It should be understood, however, that this invention may be embodied in many different forms and should not be construed as limited to the embodiments set forth herein. Rather, these embodiments are provided so that this disclosure will be thorough and complete, and will fully convey the scope of the invention to those skilled in the art. Additionally, the present invention is described below with reference to block diagrams and flowchart illustrations of systems, methods, apparatuses, and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. Further, these computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks. Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

According to exemplary embodiments, the present invention comprises systems and methods for more accurately predicting flame blowout conditions and/or precursors for combustors. Unless otherwise limited, the present invention may be applicable to all types of combustors and is designed to operate over a diverse range of environmental condition, including varying temperatures, humidity, air compositions, and fuel compositions. Thus, the present invention may be applicable to combustors such as those found in industrial systems, land based or aeronautical gas turbine engines. The design of the combustor and its disposition in an engine casing is well known to those skilled in the art and is in no way limited to the examples enumerated herein.

In accordance with exemplary embodiments of the present invention, FIGS. 4 through 7 illustrate a blowout detection unit 75 that may be incorporated into the data processing system 60. It should be appreciated that the blowout detection unit 75 also may be incorporated into similar such data processing systems. As described herein, the blowout detection unit 75 may identify blowout precursors that indicate that the flame in a combustor is near to blowing out or that there exists an increased or high risk of a blowout in a near term timeframe. By identifying such blowout precursors, feedback related to the combustor may be provided to the unit controller so that the blowout may be avoided or the high or increased risk reduced via an appropriate control response or adjustment. An example of such feedback is discussed more below in relation to FIG. 7.

As already described above, the pressure sensor 62 may be coupled to a combustor and configured to detect or measure an acoustic or oscillating pressure signal related thereto. The pressure sensor 62 may be a pressure transducer or any other suitable device that can accurately measure such operating parameters. For example, in an exemplary embodiment, the pressure sensor 62 is a pressure transducer capable of measuring pressure oscillations up to roughly 20 KHz. The pressure sensor 62 further may be mounted in the combustor, tangential to the combustor, or in any other acoustically acceptable location that sufficiently measures such pressure levels.

Figure 4:
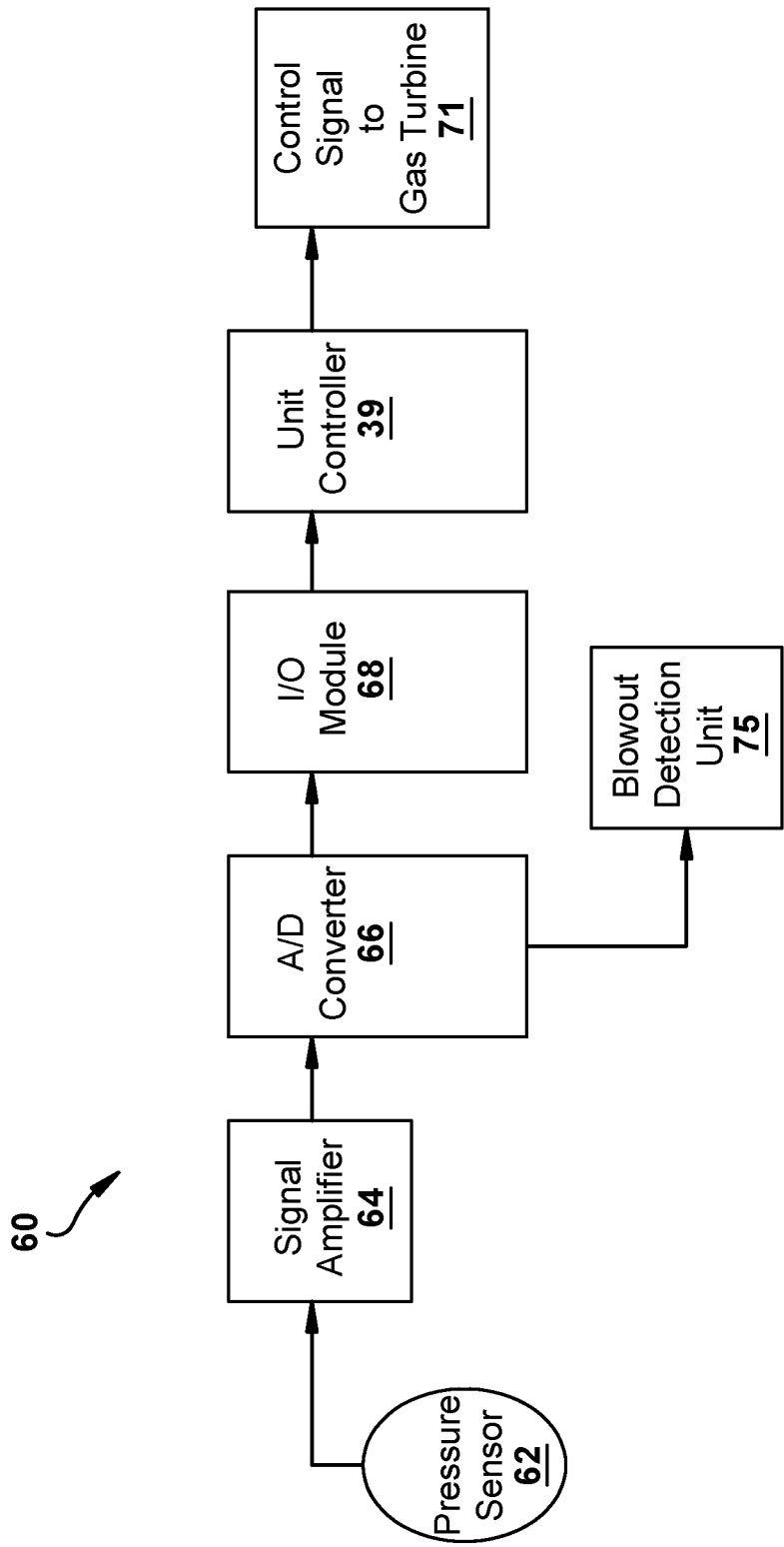
FIG. 4 is a block diagram illustrating an exemplary signal processing system with a blowout detection unit in accordance with exemplary embodiments of the present invention.
Figure 5:
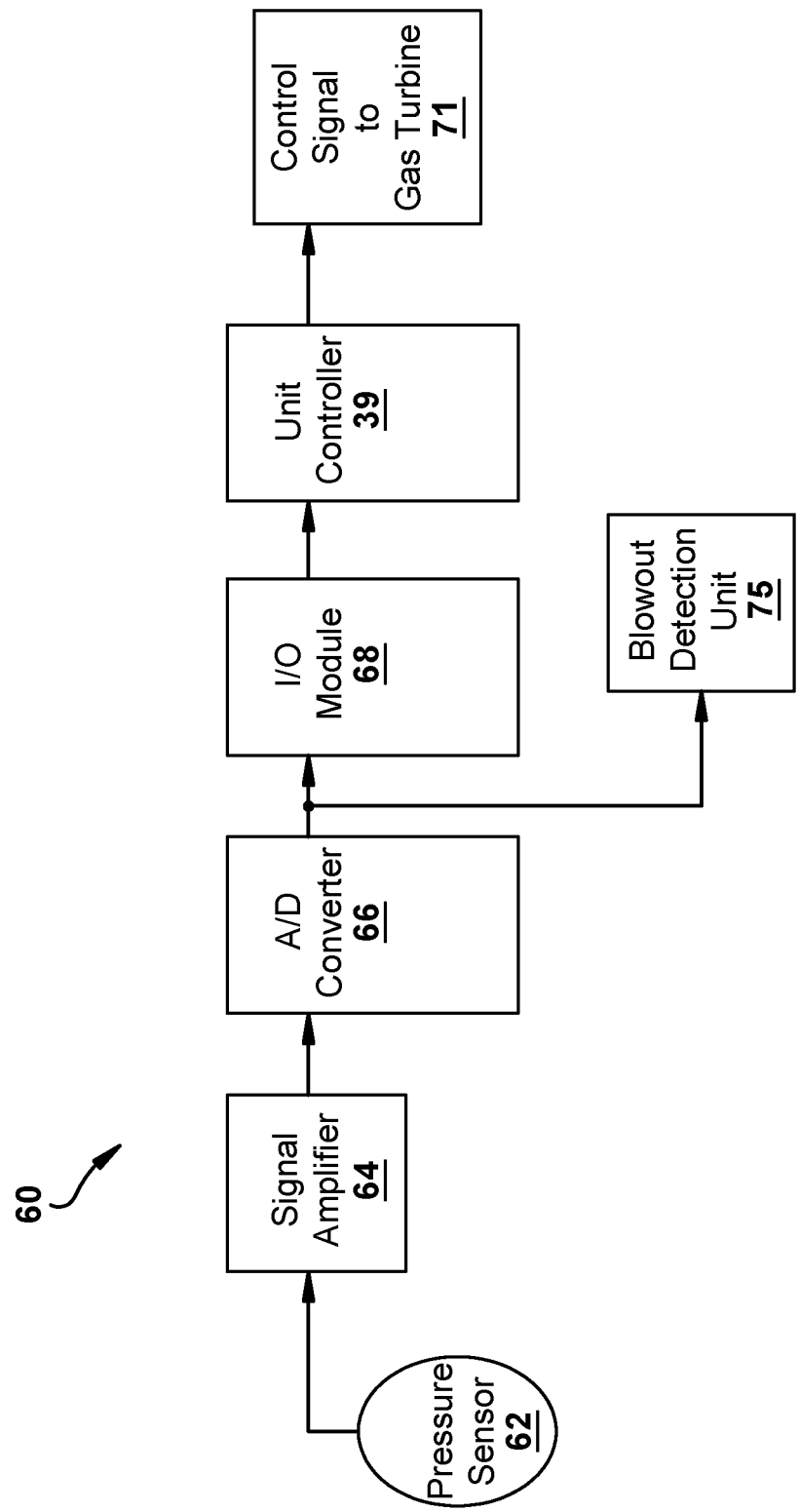
FIG. 5 is a block diagram illustrating an exemplary signal processing system with a blowout detection unit in accordance with exemplary embodiments of the present invention.
Figure 6:
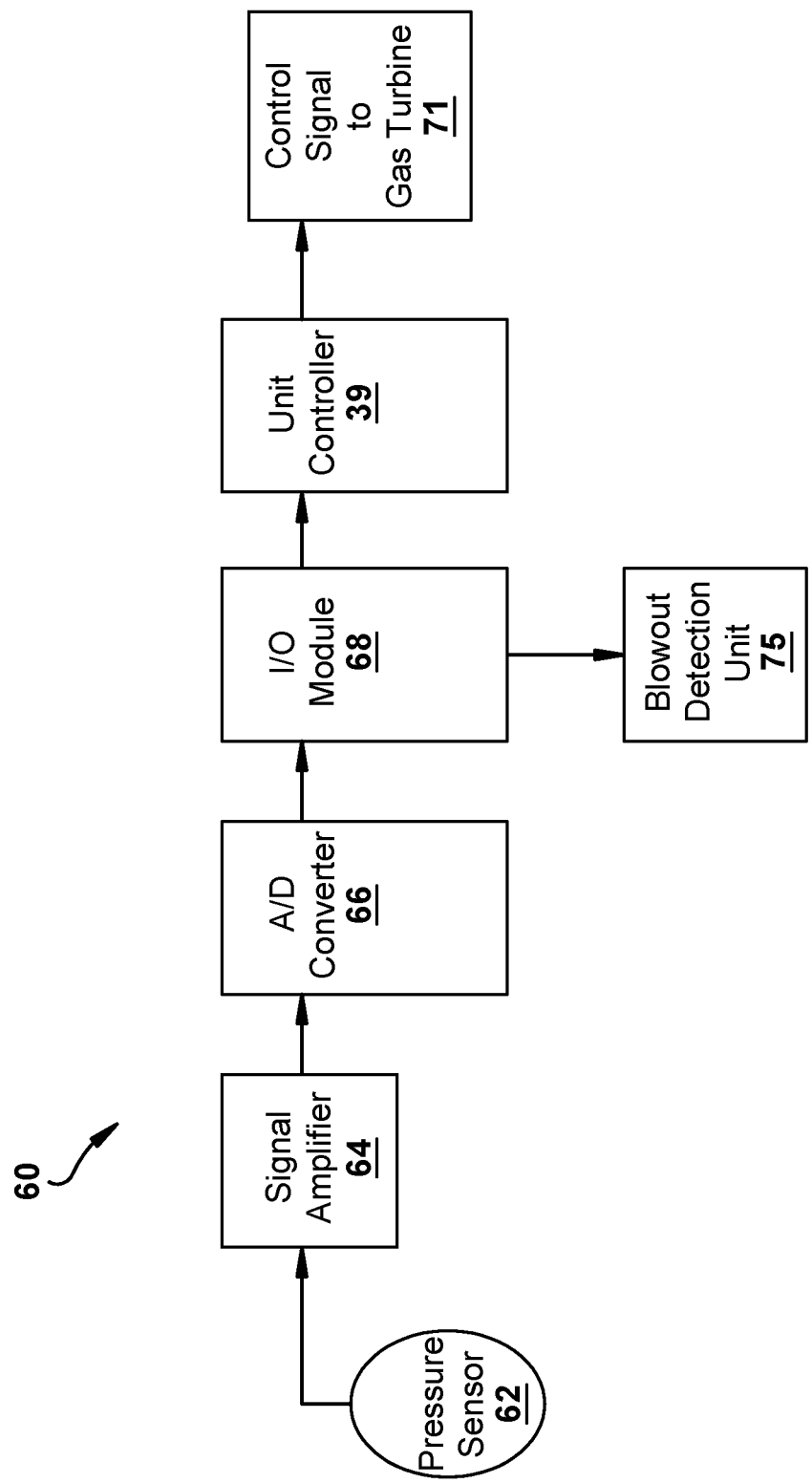
FIG. 6 is a block diagram illustrating an exemplary signal processing system with a blowout detection unit in accordance with exemplary embodiments of the present invention.

According to exemplary embodiments, the blowout detection unit 75 is configured to receive a stream of raw data that includes the pressure measurements taken by the pressure sensor 62 within the combustor. As will be appreciated, this may be accomplished in a number of ways, with FIGS. 4 through 6 illustrating several preferred embodiments for achieving this result via the integration of the blowout detection unit 75 into the signal processing system 60. Thus, as shown in FIG. 4, the blowout detection unit 75 connects to the A/D converter so that the raw data streaming or moving therethrough is also routed to and collected by the blowout detection unit 75. In doing this, the raw data stream may have already been converted to a digital signal. Alternatively, as shown in FIG. 5, the blowout detection unit 75 may connect to a communication link that connects the A/D converter 66 to the I/O module 68. As shown in the embodiment of FIG. 6, the blowout detection unit 75 instead may connect directly to the I/O module 68. In this case, as will be appreciated, the connection to the I/O module may be configured so that the blowout detection unit 75 receives the raw data stream and not the data stream as it may be transformed within the I/O module for transmission to the unit controller 39. As previously described, the data stream may be materially transformed within the I/O module 68 via aggregation, condensing, or an FFT algorithm such that the data stream becomes a processed data stream thereafter. Thus, the embodiment of FIG. 6 anticipates that the blowout detection unit 75 taps into the raw data stream as received by the I/O module, and not the processed data stream that the I/O module 68 transmits to the unit controller 39.

Figure 7:
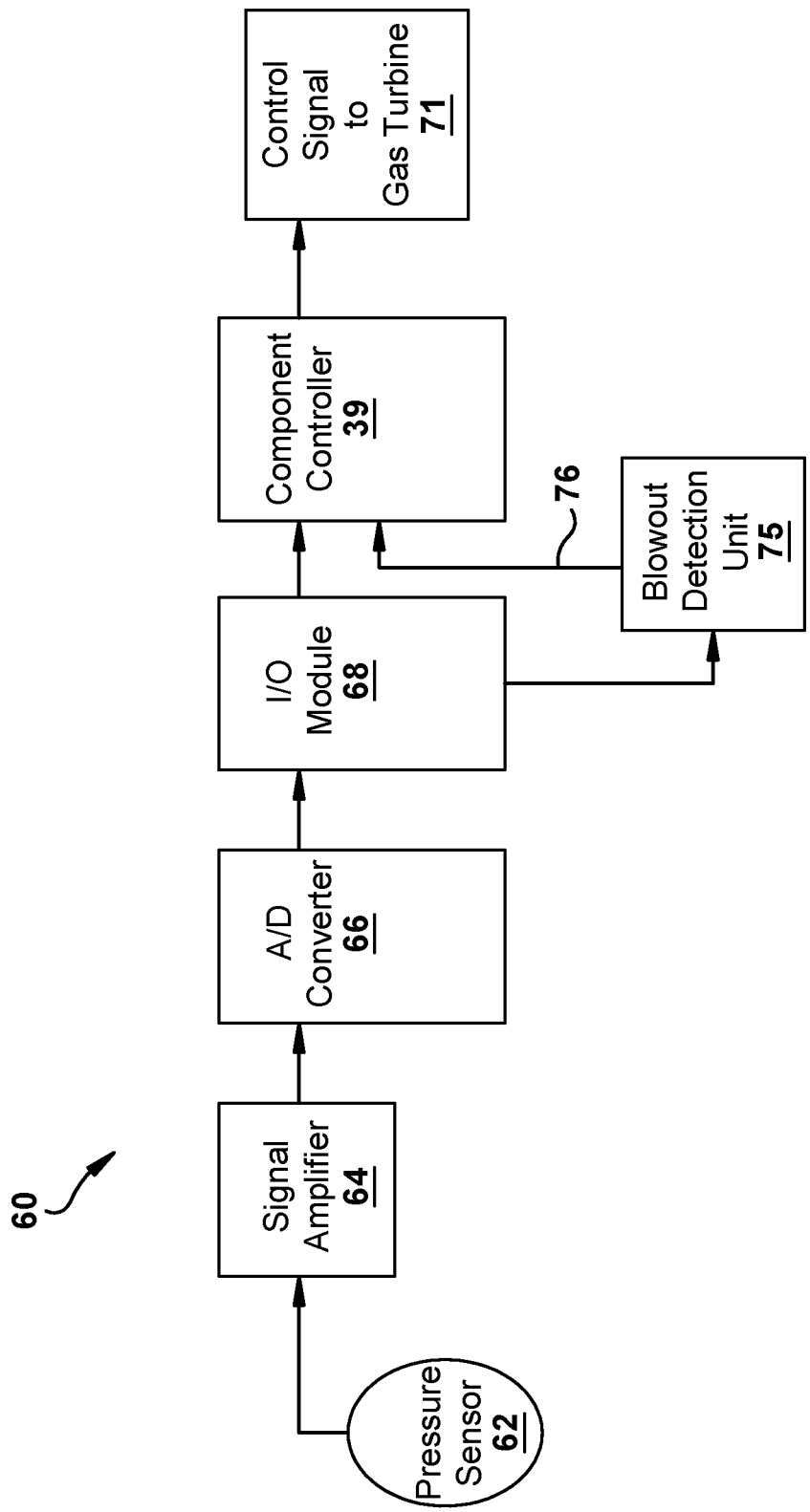
FIG. 7 is a block diagram illustrating an exemplary signal processing system with a blowout detection unit in accordance with exemplary embodiments of the present invention.

As illustrated in FIG. 7, according to another preferred arrangement, the blowout detection unit 75 may include a feedback connection 76 by which it connects to the unit controller 39. As should be understood, the feedback connection 76 may be used with any of the embodiments described herein, including those of FIGS. 4, 5, and 6. Functionally, the feedback connection 76 allows analytic results derived within the blowout detection unit 75 to be supplied to the unit controller 39. The feedback connection 76 between the blowout detection unit 75 and the unit controller 39, thus, may enable the unit controller 39 to make control adjustments based on feedback related to analytics performed with the blowout detection unit 75 on the steaming raw pressure data. The unit controller 39 then may use this feedback to make timely control adjustments that avoid blowouts or reduce their likelihood.

According to exemplary embodiments, the blowout detection unit 75 may be connected to or integrated within the previously described edge computing device or ESP unit 45. The blowout detection unit 75 preferably is configured with an interface via one of the user input devices 39, which enables users to configure setup information, input threshold settings, and/or additional information that affects the manner in which blowout precursors are detected as well as the nature of the remedial actions to take once detection has occurred. Alternatively, such information may be inputted by other suitable or conventional means. Thus, the blowout detection unit 75 may be designed to receive raw pressure data from the pressure sensor 62 and, based on the results of analysis performed on the raw pressure data, detect the existence of blowout precursors. The manner in which such detections are made, as discussed more in relation to FIG. 9, includes the operation of one or more detection analytics that may be included within the blowback detection unit 75.

According to exemplary embodiments of the present invention, the blowout detection unit 75 includes software running on a microprocessor or other suitable computing device. As will be appreciated, the blowout detection unit 75 may be embodied as a method, a data processing system, or a computer program product. Accordingly, the blowout detection unit 75 may take the form of an entirely hardware embodiment, an entirely software embodiment or an embodiment combining software and hardware aspects. Furthermore, the blowout detection unit 75 may take the form of a computer program product on a computer-readable storage medium having computer-readable program code embodied in the storage medium. Any suitable computer-readable storage medium may be utilized.

Figure 8:
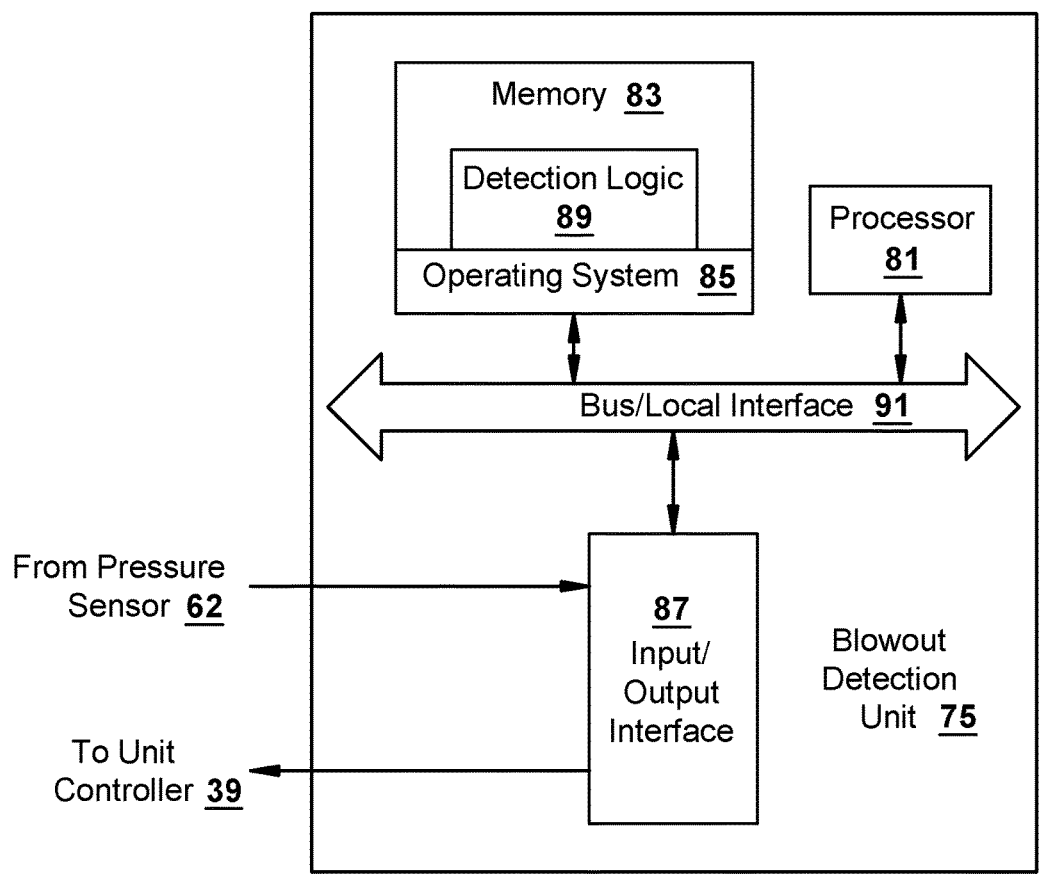
FIG. 8 is a block diagram illustrating the basic components of the blowout detection unit.

According to one example, as shown in FIG. 8, the blowout detection unit 75 comprises a processor 81, a memory 83, an operating system 85, an input/output interface 87 and a database 89, which all communicate via a bus or local interface 91. Briefly, the processor 81 executes the operating system 83, which controls the execution of other program code such as that comprising the detection logic 89 for implementing the functionality described herein. The local interface 91 may be, for example but not limited to, one or more buses or other wired or wireless connections. The local interface 91 may have additional elements, which are omitted for simplicity, such as controllers, buffers (caches), drivers, repeaters, and receivers, to enable communications. Furthermore, the local interface 91 may include address, control, and/or data connections to enable appropriate communications among the aforementioned components. The processor 81 is a hardware device for executing software, particularly that stored on memory 83. The processor 81 may be any custom-made or commercially-available processor, a central processing unit (CPU), and auxiliary processor among several processors associated with the system 100 a semi-conductor based microprocessor (in the form of a microchip or chip set), a macroprocessor, or generally any device for executing software instructions. The memory 83 may comprise an operating system 85 and the detection logic 89. The architecture, operation, and/or functionality of detection logic 89 will be described in detail below. The memory 83 may include any one or combination of volatile memory elements (e.g., random access memory (RAM) and non-volatile memory elements (e.g., ROM, hard drive, CD-ROM)). The memory 83 may incorporate electronic, magnetic, optical and/or other types of storage media. Furthermore, memory 83 may have a distributed architecture, in which various components are situated remote from one another, but can be accessed by processor 81.

Figure 9:
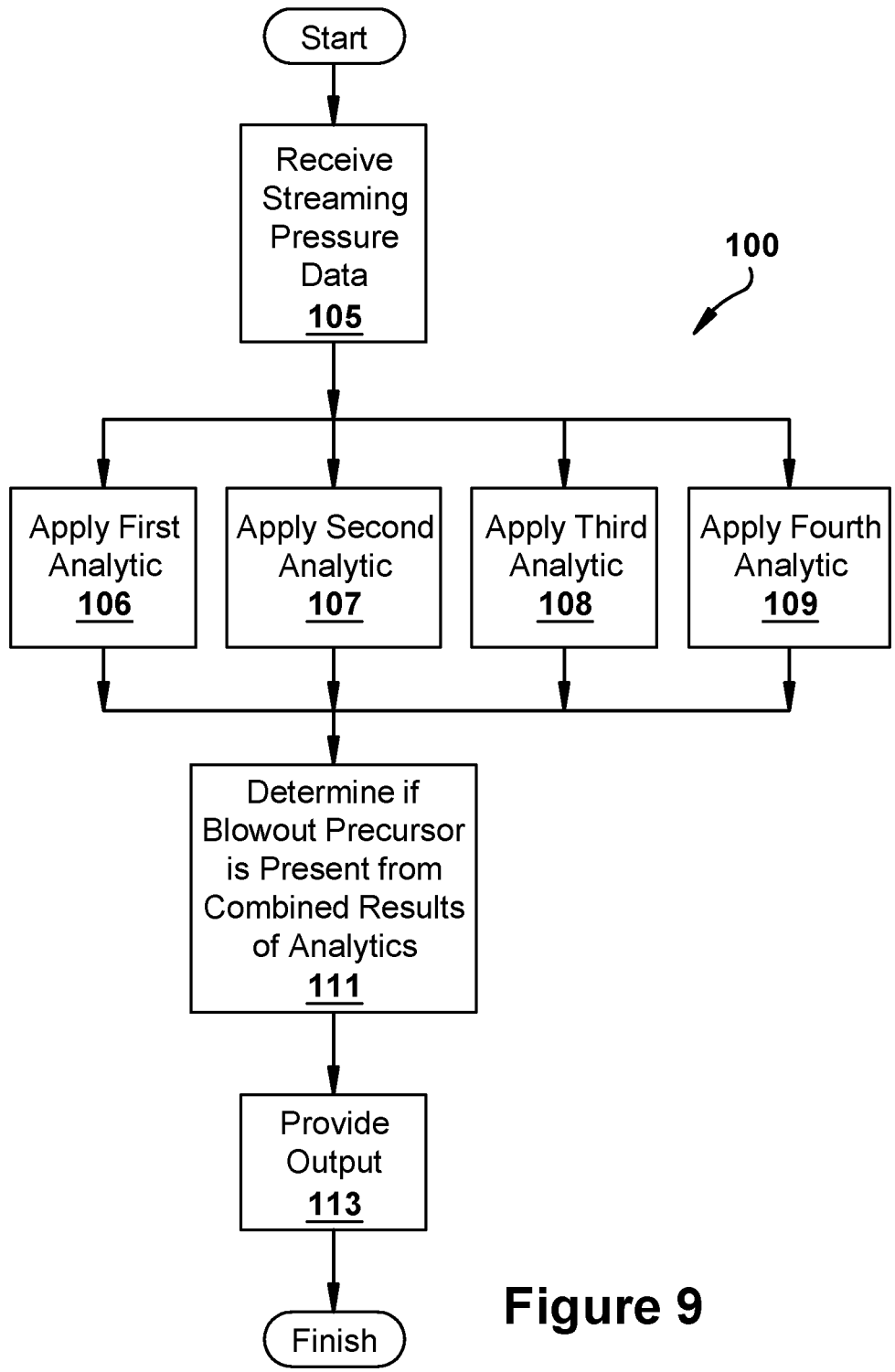
FIG. 9 is a process diagram illustrating a method of detecting blowout precursors in accordance exemplary embodiments of the present invention.

The software in memory 83 may include one or more separate programs, each of which comprising executable instructions for implementing logical functions. In the example of FIG. 9, a software in memory 83 includes an analytic procedure (as represented by the detection logic 89) according to the present invention. The memory 83 may further comprise a suitable operating system 85 that controls the execution of other computer programs, such as the detection logic 89, and provides scheduling, in-output control file and data management, memory management, and communication control and related services.

The input/output interfaces 87 may be any device or devices configured to facilitate communication with the blowout detection unit 75. The communications may be with a communication network, such as a public or private packet-switched or other data network including the Internet, a circuit switched network, such as the public switch telephone network, a wireless network, an optical network, or any other desired communication infrastructure. Alternatively, the input/output interfaces may also include any one of the following or other devices for facilitating communication with local interface 91: a user interface device such as a keyboard or mouse, a display device such as a computer monitor, a serial port, a parallel port, a printer, speakers, a microphone, etc. During operation of the blowout detection unit 75, a user may interact with the detection logic 89 via such user interface and display devices. The detection logic 89 may be a source program, executable program (object code), script, or any other entity comprising a set of instructions to be performed. When implemented as a source program, then the program needs to be translated via a compiler, assembler, interpreter, or like, which may or may not be included within the memory 83, so as to operate properly in connection with the operating system 85. Furthermore, the detection logic 89 may be written as an object-oriented program language, which has classes of data and methods, or a procedure program language, which has routines, subroutines, and/or functions, for example but not limited to, C++, Pascal, Basic, Fortran, Cobol, Perl, Java, and Ada.

It will be appreciated by one of ordinary skill in the art that one or more of the blowout detection unit 75 components may be located geographically remotely from other blowout detection unit 75 components. Furthermore, one or more of the components may be combined, and additional components performing functions described herein may be included in the blowout detection unit 75. In addition, one or more, if not all, of the components of the blowout detection unit 75 may be incorporated into the unit controller 39 and/or a separate combustor controller.

The blowout detection unit 75 may be configured to receive through the input/output interface 87 raw pressure data captured by the pressure sensor 62. As discussed in regards to FIGS. 9 and 10, the detection logic 89 may utilize one or more signal processing methods to analyze the pressure data for the detection of a blowout precursor. The detection logic 89 may include hard-coded threshold values for blowout precursor detection or may use input threshold values that are inputted into the memory 83 through the input/output interface 87. The detection of a blowout precursor may result in a signal being transmitted from the blowout detection unit 75 via the input/output interface 87 to a controller associated with the functioning of the combustor, such as the unit controller 39, which indicates that the flame is near or nearing blowout conditions. This communication may prompt the unit controller 39 to take a preemptive control action so that the blowout conditions are avoided.

For example, the unit controller 39 may controls the operation of the combustor 30 and be in communication with the blowout detection unit 130. Such controllers that monitor and control combustor operation are well known, and therefore are not described in detail as a part of this disclosure. According to preferred embodiments, upon receiving a signal indicating the detection of a blowout precursor by the detection logic 89, the unit controller 39 may make appropriate adjustments to the operating parameters of the combustor 30 to prevent blowout. Parameters within the combustor that may be adjusted, for example, may include: the amount of fuel being sent to the fuel nozzles; the amount of compressed air allowed in the combustion chamber; and/or the desired engine power output.

FIG. 9 is a flow diagram 100 illustrating the architecture, functionality and/or operation of the detection logic 89 of the blowout detection unit 75. As illustrated, the method of flow diagram 100 begins at an initial step or block 105 with the receiving of raw acoustic or pressure data from the pressure sensor 62. The data may be received from either a digital or analog pressure sensor 62 and according to any of the systems or methods already described herein or otherwise. If the pressure sensor 62 is analog, one of ordinary skill in the art would appreciate that known signal processing techniques may be used to transform the analog signal into accurate and quality digital representations of that analog signal, such as, for example, implementing anti-aliasing filters.

According to subsequent steps and as described in more detail below, the received raw stream of pressure data may be analyzed by one or more different and separate detection analytics ("analytics"). As will be appreciated, the present invention may include ensemble approach in which the detection of the blowout precursor depends upon a plurality of outcomes generated respectively from a plurality of separate analytics. For example, as illustrated, such analytics may include one or more of: a first analytic 106; a second analytic 107; a third analytic 108; and/or a fourth analytic 109. As described below, each of the four analytic techniques represent sub-methods of analysis. However, it should be understood that when implementing the present invention, it is contemplated that any combination of the several detection analytics provided herein may be used for the ultimate determination as to whether a blowout precursor is present. That is, the method may use one, two, three or all four of the analysis techniques and/or any combination thereof to analyze the raw pressure data. The ensemble approach thus may include a final step in which an overall ensemble result is calculated given the plurality of outcomes generated respectively from the plurality of separate analytics. Whether or not a blowout precursor is detected may then depend on the overall ensemble result. Each of the separate analytics 106, 107, 108, 109 will now be discussed in accordance with exemplary embodiments of the present invention.

According to exemplary embodiments, the first analytic 106 may include a calculation as to whether incoming data varies beyond a certain threshold when compared to a steady state condition, where the steady state condition is determined according to a defined look-back period relative to the incoming data. As used herein, a look-back period is a sliding temporal window that is defined relative to the selected or current pressure data point. The first analytic 106 may include aspects of statistical process control. For example, according to preferred embodiments, the first analytic 106 calculates whether a selected or current data point has a value that is outside of the three-sigma range (i.e., is outside of three standard deviations of the mean). More specifically, the three-sigma range and mean are calculated using each of pressure data points within the raw data stream that falls within a predetermined look-back period (as calculated relative to a selected or current data point). Thus, for example, the look-back period may be defined as including the time series data from the pressure sensor that falls within a predetermined period or window of time that precedes the current data point. Preferably, the window of time related to the look-back period immediately precedes the current data point such that the latest data point within the look-back period is a data point occurring just prior to the current data point. As will be appreciated, the current data point may be defined merely as a subject data point or, more preferably, as the data point that corresponds to the latest and valid data point received by the blowout detection unit 75. According to exemplary embodiments, the look-back period of the first analytic 106 includes a period of between 1 and 20 minutes. Preferably, the look-back period of the first analytic 106 includes a period of between 8 and 12 minutes. More preferably, the look-back period of the first analytic 106 is approximately 10 minutes.

The output of the first analytic 106 may indicate a result of the calculations made by the first analytic 106. Such output may be fashioned in any number of ways, such as in a binary or "positive/negative" manner that communicates a singular aspect or outcome of the analysis. For example, the output of the first analytic 106 may be a "positive" for instances where the value of the current data point is outside of the three-sigma limit (and indicative of a possible blowout precursor) and a "negative" for instances where the current data point is inside the three-sigma limit (and not indicative of a possible blowout precursor). According to alternative embodiments, the output of the first analytic 106 may include additional information related to the calculations preformed. For example, in cases where the current data point is outside the three-sigma limit, the output may include the extent to which the value of the current data point exceeds the three-sigma boundary.

According to exemplary embodiments, the second analytic 107 may include a calculation related to the standard deviation for incoming data within a defined look-back period. For example, according to preferred embodiments, the second analytic 107 may calculate a value for the standard deviation for the streaming data within the defined look-back period. For example, according to preferred embodiments, the second analytic 107 determines whether the calculated standard deviation during the defined look-back period is equal to about zero (0.0). As before, the look-back period may include the time series data falling within a window of time that precedes a current time. Preferably, the look-back period may be defined as the window of time that immediately precedes the current time. According to exemplary embodiments, the look-back period of the second analytic 107 includes a period of between 1 and 20 minutes. Preferably, the look-back period of the second analytic 107 includes a period of between 8 and 12 minutes. More preferably, the look-back period of the second analytic 107 is about 10 minutes.

The output of the second analytic 107 may indicate a result of the calculations made by the second analytic 107. Such output may be fashioned in any number of ways, such as in a binary or "positive/negative" manner that communicates a singular aspect or outcome of the analysis. For example, the output of the second analytic 107 may be a "positive" for those instances where the value of the standard deviation does not equal zero (and indicative of a possible blowout precursor) and a "negative" for instances where the standard deviation is equal to zero (and is not indicative of a possible blowout precursor, for example, because the sensor associated with the pressure measurements is not functioning correctly). According to other embodiments, the output of the second analytic 107 may include additional information. For example, in cases where the value of the standard deviation does not equal zero, the output may include the calculated value of the standard deviation for the data within the look-back period.

According to exemplary embodiments, the third analytic 108 may include a method of advanced anomaly detection whereby one or more entropy features of the streaming time series pressure data is tracked and analyzed. For example, according to a preferred embodiment, an entropy value associated with a permutation entropy is calculated for the streaming time series data. As used herein, permutation entropy is defined as a measure for arbitrary time series based on analysis of permutation patterns. As will be appreciated, permutation entropy may provide a relatively simple yet robust method to estimate complexity within time series data by taking the temporal order of the values of the pressure data points into account. Furthermore, permutation entropy can be used to determine embedded parameters or identify couplings between time series. Thus, in accordance with certain preferred embodiments, the entropy value may be an appropriate measure of complexity given the incoming stream or permutation of acoustic data. A sliding window complexity analysis, such as by using data values within the aforementioned look-back period, then may done and used to calculate a current entropy value. According to exemplary embodiments, the current entropy value then may be compared to one or more threshold values that have been found to indicate the likelihood that an anomaly, such as a blowout precursor, is present within the streaming time series pressure data.

The output of the third analytic 108 may indicate a result of the calculations made by the third analytic 108. Such output may be fashioned in any number of ways, such as in a binary or "positive/negative" manner that communicates a singular aspect or outcome of the analysis. For example, the output of the third analytic 108 may be a "positive" for instances where the current entropy value exceeds a predetermined entropy threshold (and indicative of a possible blowout precursor) and a "negative" for instances where the current entropy value does not exceed the predetermined entropy threshold (and not indicative of a possible blowout precursor). According to other embodiments, the output of the third analytic 108 may include additional information. For example, in cases where the current entropy value exceeds the predetermined entropy threshold, the output may include the extent to which that threshold has been exceeded.

According to exemplary embodiments, the fourth analytic 109 may include another advance method of anomaly detection. In this case, according to a preferred embodiment, a manifold learning approach to anomaly detection may be implement. As will be appreciated, a manifold learning approach is one that detects anomalous patterns in multivariate or high-dimensional time series data. In general, high-dimensional data is data that requires more than two or three dimensions to represent. Because of this high-dimensionality, this type of data is often difficult to interpret. The manifold leaning approach simplifies such data by assuming the data of interest lies on an embedded non-linear surface or shape (which is the "manifold") within the higherdimensional space. If the manifold is of low enough dimensions, the data can be visualized in the low-dimensional space. Because the data streams of the present invention (i.e., the raw data produced by the pressure sensors) exhibit high-dimensionality, the fourth analytic 109 includes transforming the raw variables within the streaming pressure data via a projection onto a manifold space. For example, via a kernel-based Laplacian projection, the raw data may be mapped onto a manifold space. Once mapped in this manner, a value for an anomaly indicator may then be calculated via the pattern produced. For example, an anomaly score may depend upon a measure of the density of data samples in the manifold space. Lower density may signify a higher anomaly possibility. In this case, a sliding window analysis also may be done which uses pressure data point values within the aforementioned look-back period. The calculated value of the anomaly indicator may then be compared to predetermined threshold value of the anomaly indicator.

The outcome of the fourth analytic 109 may indicate a result of the calculations made by the fourth analytic 109. Such outcome may be fashioned in any number of ways, such as in a binary or "positive/negative" manner that communicates a singular aspect or outcome of the analysis. For example, the outcome of the fourth analytic 109 may be a "positive" for instances where the current anomaly score exceeds a predetermined threshold (and indicative of a possible blowout precursor) and a "negative" for instances where the current anomaly score does not exceed the predetermined threshold (and is not indicative of a possible blowout precursor). According to other embodiments, the outcome of the fourth analytic 109 may include additional information. For example, in cases where the current anomaly score exceeds the predetermined threshold, the outcome may include the extent to which that threshold has been exceeded.

After the pressure data has been analyzed by one or more of the analytic steps 106, 107, 108, 109, the present method may determine whether a blowout precursor is present at a block 111. That is, one or more of the results of the analysis steps 106, 107, 108, 109 may indicate that a flame within the combustor is nearing blowout conditions. As stated, a positive indication of the flame nearing blowout conditions is known as a blowout precursor. The determination of a blowout precursor may be based on any combination of the results of the analysis techniques and their respective sub-methods described herein. For example, based on the same time series data, the result of one analytic may indicate that the flame is nearing blowout conditions, whereas the result of another may not indicate such a proximity. In such situations, the blowout precursor determination at step 111 may include logic whereby the positive indication from a single analysis technique is sufficient to indicate a blowout precursor, and thus conclude with a positive identification of the existence of a blowout precursor. It is further contemplated that the results of the analytics may be combined in other ways, such as requiring that each of the analytics positively identify a blowout precursor before a positive identification is produced. Thus, according to possible embodiments of the present invention, the results may be used individually or in any combination to identify blowout precursors at step 111.

Further, the combination of such analysis techniques also may be operator or user dependent. That is, the user may choose a risk factor and, thereby, decide how close to flame blowout conditions it is desired for the combustor to operate. For instance, if a particular operator of the turbine engine wants the combustor to operate extremely close to blowout conditions (for example, to reduce emissions), the blowout precursor determination logic at step 111 may require that all four of the analysis techniques to indicate, or even strongly indicate, that the flame is near blowout before a positive existence of a blowout precursor is produced. The method for determining blowout precursors may end after the blowout precursor detection step 111 or, alternatively, the method may continuously operate on the raw pressure data as it is received from the combustor.

Further, the method may include a step 113 where an overall outcome or output of the blowout detection analytics is provided. As further discussed herein, this output, which may include the positive identification of a blowout precursor, may be provided to an operator or other user via one or more of the user input devices 39. Such output further may trigger an automated control response aimed at avoiding the occurrence of the predicted blowout. For example, as shown in FIG. 7, the blowout detection unit 75 may connect to the unit controller 39 and thereby provide an output signal alerting the unit controller 39 of the blowout precursor so that timely action may be taken to reduce the likelihood that a blowout actually occurs.

Figure 10:
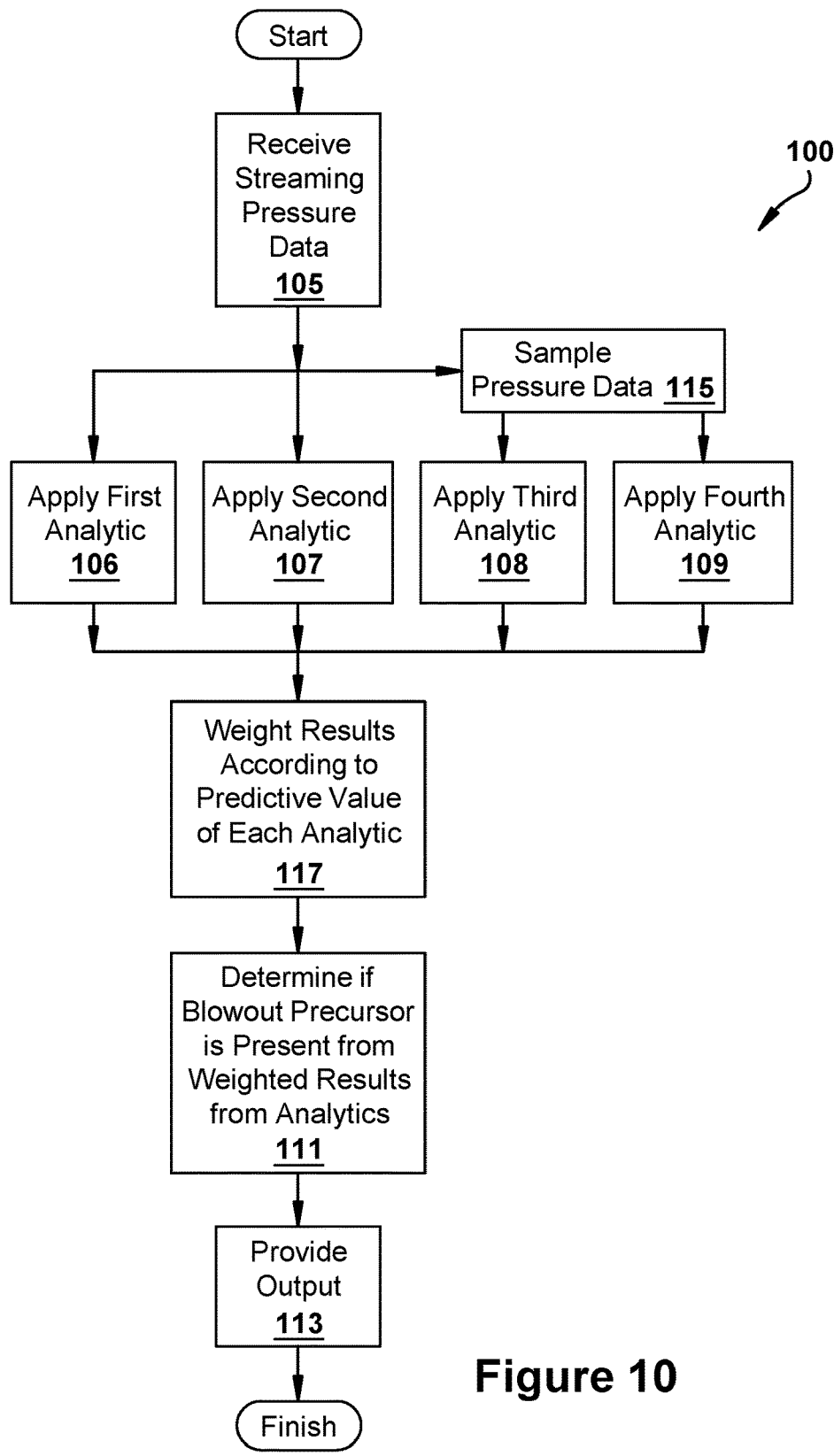
FIG. 10 is a process diagram illustrating an alternate method of detecting blowout precursors in accordance exemplary embodiments of the present invention.

With reference now to FIG. 10, an embodiment of the flow diagram 100 is provided according to alternative functionality or operation of the detection logic 89. Specifically, as shown, two newly present steps or blocks—i.e., a block 115 and block 117—are introduced within the flow diagram.

In the case of newly presented block 115, the raw pressure data is sampled before being fed one or more of the analytics, for example, the third analytic 108 and fourth analytic 109. This may be done so that the slower computational speeds associated with the advanced anomaly detection methods of the third analytic 108 and fourth analytic 109 are accounted for when these analytics are combined in use with the computationally faster first analytic 106 and second analytic 107. More specifically, with reference to the description above in relation to FIG. 9, the computations required by the first analytic 106 and second analytic 107 may be performed at a much faster rate than the more complex one required by the third analytic 108 and fourth analytic 109. Thus, while computations anticipated within the first analytic 106 and second analytic 107 may be performed quickly enough to "keep up" with the pace of the streaming raw data (which, for example, may be streaming at a pace of measurements taken every 50 to 90 microseconds), the computations required by the third analytic 108 and fourth analytic 109 may not be able to be performed at the required pace.

Thus, according to preferred embodiments, at the block 115 of FIG. 10, samples may be taken from the raw pressure data and provided to the third analytic 108 and fourth analytic 109. Such sampling may be done so that the third analytic 108 and fourth analytic 109 receive data points at a rate that is much reduced, for example, between every 5 to 20 milliseconds. Thus, according to preferred embodiments, the sampling performed at block 115 selects approximately one data point for every 100 to 200 data points within the time series of streaming raw pressure data. These selected or sampled data points then may be transmitted to the third analytic 108 and fourth analytic 109 for analysis. The third analytic 108 and fourth analytic 109 then may perform their calculations using this subset of data in the manner already described. In this manner, the third analytic 108 and the fourth analytic 109 may be performed in a timely manner relative to the calculations being made by the first analytic 106 and second analytic 107 on the unsampled stream of data.

In the case of newly presented block 117, the several outcomes from the first, second, third, and/or fourth analytics 106, 107, 108, 109 may be weighted according to a relative predictive strength before being passed to the block 111 for the determination as to whether the blowout precursor is present. As already stated, it is contemplated that the results of the analytics can be combined in any manner to detect blowout precursors. And, according to exemplary embodiments, the results may be used individually or in combination to identify blowout precursors at step 111. As further explicitly provided in the block 117, the combined results from the analytics 106, 107, 108, 109, may be defined by logical or mathematical relationship suitable for such determination, including a specific weighting scheme wherein the results of one analysis technique is weighed more heavily or given more predictive power in the blowout precursor determination than the others results. For example, according to preferred embodiments, the third analytic 108 and fourth analytic 109 may be weighted such that each is given more predictive power or weight than either of the first analytic 106 and second analytic 107.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

The invention claimed is:

1. A system for controlling an operation of a combustor in a gas turbine, the system comprising:
   the combustor;
   an acoustic sensor configured to periodically measure a pressure of the combustor and generate a a raw data stream that comprises pressure data points resulting from the periodic measurement of the pressure; and
   a blowout detection unit configured to receive the raw data stream from the acoustic sensor;
   wherein the blowout detection unit comprises a processor and a machine-readable storage medium on which is stored instructions that cause the processor to execute a procedure related to a detection of a blowout precursor; and
   wherein the procedure comprises an ensemble approach in which the detection of the blowout precursor depends upon a plurality of outcomes generated respectively from a plurality of separate detection analytics, the plurality of separate detection analytics of the ensemble approach comprising at least two selected from the following detection analytics:
   a first detection analytic that comprises a calculation as to whether a selected pressure data point of the pressure data points within the raw data stream varies from a steady state condition, wherein the steady state condition is defined by the pressure data points of the raw data stream that fall within a look-back period that precedes the selected pressure data point;
   a second detection analytic that comprises a calculation of a standard deviation for the pressure data points of the raw data stream within the look-back period;
   a third detection analytic that comprises calculating an entropy value related to an entropy feature of the pressure data points of the raw data stream within the look-back period; and
   a fourth detection analytic that comprises a manifold anomaly detection approach that includes calculating a value of an anomaly indicator that is based on a pattern formed when the pressure data points of the raw data stream within the look-back period are projected onto a manifold shape.

2. The system according to claim 1, wherein the blowout precursor comprises an indication of an increased risk of a flame blowing out in the combustor;
   wherein the look-back period comprises a sliding temporal window that is defined relative to the selected pressure data point;
   wherein the look-back period comprises a period of between 1 and 20 minutes; and
   wherein the selected pressure data point comprises a most current one of the pressure data points received by the blowout detection unit from the acoustic sensor.

3. The system according to claim 1, wherein the look-back period comprises a period of between 8 and 12 minutes; and
   wherein:
   the first detection analytic comprises calculating whether the selected pressure data point is outside of three standard deviations of a mean of the pressure data points that fall within the look-back period;
   the second detection analytic comprises calculating whether a value for a standard deviation for the pressure data points that fall within the look-back period is equal to about zero;
   the entropy feature of the third detection analytic comprises a permutation entropy, wherein the calculation of the entropy value of the permutation entropy is based on permutation patterns given a temporal ordering of values of the pressure data points that fall within the look-back period; and
   the projection of the manifold anomaly detection approach o the fourth detection analytic comprises a kernel-based Laplacian projection.

4. The system according to claim 3, wherein the outcome of each of the first detection analytic, the second detection analytic, the third detection analytic, and the fourth detection analytic comprises one of: a positive result, which indicates an increased likelihood of the blowout precursor; and a negative result, which indicates a decreased likelihood of the blowout precursor;
   wherein:
   in regard to the first detection analytic, the positive result corresponds to the selected pressure data point being outside of the three standard deviations of the mean, and the negative result corresponds to the selected pressure data point being inside of the three standard deviations of the mean;
   in regard to the second detection analytic, the positive result corresponds to the standard deviation not equaling zero, and the negative result corresponds to the standard deviation equaling zero;

in regard to the third detection analytic, the positive result corresponds to the entropy value exceeding a predetermined threshold for the entropy value, and negative result corresponds to the entropy value not exceeding the predetermined threshold for the entropy value; and in regard to the fourth detection analytic, the positive result corresponds to the value of the anomaly indicator exceeding a predetermined threshold value of the anomaly indicator, and negative result corresponds to the value of the anomaly indicator not exceeding the predetermined threshold value for the anomaly indicator.

5. The system according to claim 4, wherein the plurality of separate detection analytics of the ensemble approach comprises at least three selected from the first detection analytic; the second detection analytic; the third detection analytic; and the fourth detection analytic.

6. The system according to claim 4, wherein the plurality of separate detection analytics of the ensemble approach comprises each of the first detection analytic; the second detection analytic; the third detection analytic; and the fourth detection analytic;

wherein the ensemble approach further comprises:
determining an overall ensemble result given the plurality of outcomes generated respectively from the plurality of separate detection analytics, the overall ensemble result being based on:
which of the first detection analytic, the second detection analytic, the third detection analytic, and the fourth detection analytic produces the positive result; and
which of the first detection analytic, the second detection analytic, the third detection analytic, and the fourth detection analytic produces the negative result;
basing the detection of the blowout precursor on the overall ensemble result.

7. The system according to claim 6, wherein the step of determining the overall ensemble result comprises weighting the outcomes of the first detection analytic according to a relative predictive strength.

8. The system according to claim 7, wherein a frequency of the periodic measurement of the pressure comprises at least 13,000 hertz and the raw data stream includes each of the pressure data points generated by the acoustic sensor;

wherein the procedure performed by the blowout detection unit further comprises:
sampling the raw data stream via a sampling process to generate a sampled raw data stream, wherein the blowout detection unit comprises both the raw data stream and the sampled raw data stream;
feeding the raw data stream to one or more of the first detection analytic, the second detection analytic, the third detection analytic, and the fourth detection analytic for use in determining the outcomes; and
feeding the sampled raw data stream to one or more of the first detection analytic, the second detection analytic, the third detection analytic, and the fourth detection analytic for use in determining the outcomes.

9. The system according to claim 8, wherein the sampling process comprises selecting one of the pressure data points for every 100 to 200 of the pressure data points in the raw data stream;

wherein weight comprises the predictive strength of the outcomes of each of the third detection analytic and the fourth detection being greater than the predictive strength of the outcomes of each of the first detection analytic and the second detection analytic; and wherein the procedure performed by the blowout detection unit further comprises:
the feeding the raw data stream to the first detection analytic and the second detection analytic for use thereby in determining the outcomes; and
feeding the sampled raw data stream the third detection analytic and the fourth detection analytic for use thereby in determining the outcomes.

10. The system as in claim 1, further comprising a controller that controls the operation of the combustor;

wherein the blowout precursor comprises an indication of an increased risk of a flame blowing out in the combustor;
wherein a first communication link connects the blowout detection unit to the controller;
wherein the procedure comprises the step of transmitting a blowout precursor notification to the controller via the first communication link upon the detection of the blowout precursor;
wherein the controller is configured to control the operation of the combustor at least partially in response to receiving the blowout precursor notification; and
wherein the controller is configured to take preemptive control action upon receiving the blowout precursor notification, the preemptive control action comprising one expected to decrease the increased risk of the flame blowing out in the combustor.

11. The system according to claim 10, further comprising a data processing system configured to receive the raw data stream from the acoustic sensor and, once received, materially transform the raw data stream into a processed data stream;

wherein:
the preemptive control action comprises modifying at least one of: a fuel supply to the combustor; an air supply to the combustor; and a load output of the gas turbine;
a second communication link connects the data processing system to the controller, wherein the data processing system is configured to transmit the processed data stream to the controller via the second communication link; and
the controller is configured to receive the processed data stream and control the operation of the combustor in response to the processed data stream.

12. The system according to claim 11, wherein the acoustic sensor comprises a pressure transducer;
wherein a frequency of the periodic measurement of the pressure comprises at least 13,000 hertz, and the raw data stream includes each of the pressure data points generated by the acoustic sensor.

13. The system according to claim 11, wherein the acoustic sensor comprises a pressure transducer;
wherein a frequency of the periodic measurement of the pressure comprises at least 10,000 hertz and the raw data stream includes each of the pressure data points generated by the acoustic sensor;
wherein the data processing system comprises a signal amplifier, an analog-to-digital converter, and an input-output module;
wherein the data processing system materially transforms the raw data stream into the processed data stream via at least one of: a data aggregation; a data sampling; and a data conversion from a function of time to a function of frequency; and wherein a third communication link connects the blowout detection to the data processing system, wherein the third communication link connects to the data processing system such that a data stream received by the third communication link comprises the raw data stream.

14. The system according to claim 13, wherein the second communication link connects to the data processing system via one of the signal amplifier and the analog-to-digital converter.

15. The system according to claim 13, wherein a fourth communication link connects the analog-to-digital converter to the input-output module; and wherein the second communication link connects to the data processing system via one of the fourth communication link and the input-output module.

16. The system according to claim 11, further comprising a user input device configured to interface with the blowout detection unit;

wherein the procedure comprises modifying at least one criterion by which the blowout precursors are detected according to a received input from a user via the user input device.

17. The system according to claim 16, wherein the input from the user comprises a risk factor that relates to a choice made by the user as to a nearness to blowout conditions the user wants the combustor to operate; and wherein the blowout detection unit comprises an event stream processing unit.

18. A system for controlling an operation of a combustor in a gas turbine, the system comprising:

the combustor;

an acoustic sensor configured to periodically measure a pressure of the combustor and generate a raw data stream that comprises pressure data points resulting from the periodic measurement of the pressure; and a blowout detection unit configured to receive the raw data stream from the acoustic sensor, wherein the blowout detection unit comprises a processor and a machine-readable storage medium on which is stored instructions that cause the processor to execute a procedure related to a detection of a blowout precursor; and wherein the procedure comprises a plurality of separate detection analytics, including at least:

a first detection analytic that comprises a calculation as to whether a selected pressure data point of the pressure data points within the raw data stream varies from a steady state condition, wherein the steady state condition is defined by the pressure data points of the raw data stream that fall within a look-back period that precedes the selected pressure data point;

a second detection analytic that comprises a calculation of a standard deviation for the pressure data points of the raw data stream within the look-back period;

a third detection analytic that comprises calculating an entropy value related to an entropy feature of the pressure data points of the raw data stream within the look-back period; and a fourth detection analytic that comprises a manifold anomaly detection approach that includes calculating a value of an anomaly indicator that is based on a pattern formed when the pressure data points of the raw data stream within the look-back period are projected onto a manifold shape;

wherein:

the blowout precursor comprises an indication of an increased risk of a flame blowing out in the combustor;

the look-back period comprises a sliding temporal window of between 8 and 12 minutes that is defined relative to the selected pressure data point; and a frequency of the periodic measure of the pressure comprises at least 13,000 hertz and the raw data stream includes each of the pressure data points generated by the acoustic sensor.

* * * * *